US008494530B2

(12) United States Patent
Karaoguz et al.

(10) Patent No.: US 8,494,530 B2
(45) Date of Patent: *Jul. 23, 2013

(54) METHOD AND SYSTEM FOR EXTENDED NETWORK ACCESS NOTIFICATION VIA A BROADBAND ACCESS GATEWAY

(75) Inventors: Jeyhan Karaoguz, Irvine, CA (US); Marc Abrams, Aliso Viejo, CA (US); Nambirajan Seshadri, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/454,324

(22) Filed: Apr. 24, 2012

(65) Prior Publication Data
US 2012/0207134 A1 Aug. 16, 2012

Related U.S. Application Data

(63) Continuation of application No. 13/160,264, filed on Jun. 14, 2011, now Pat. No. 8,185,119, which is a continuation of application No. 12/582,540, filed on Oct. 20, 2009, now Pat. No. 7,962,164, which is a continuation of application No. 11/021,277, filed on Dec. 23, 2004, now Pat. No. 7,606,570.

(60) Provisional application No. 60/563,894, filed on Apr. 16, 2004.

(51) Int. Cl.
*H04W 36/00* (2009.01)
*H04Q 7/20* (2006.01)

(52) U.S. Cl.
USPC ........... 455/439; 455/434; 455/3.06; 455/436

(58) Field of Classification Search
USPC .............. 455/442, 455, 434, 412.2, 436, 438, 455/439, 507, 67.11, 515, 452.1, 517, 440, 455/509, 3.06, 3.01, 414.1, 466; 370/331, 370/329, 352, 338
See application file for complete search history.

(56) References Cited

U.S. PATENT DOCUMENTS 6,006,106 A 12/1999 Cook et al.
6,233,463 B1 5/2001 Wiedeman et al.
(Continued)

FOREIGN PATENT DOCUMENTS

WO WO 02054820 7/2002
WO WO 03084261 10/2003
WO WO 2004006482 1/2004

OTHER PUBLICATIONS

Waring D. L. et al.: "A Newly Emerging Customer Premises Paradigm for Delivery of Network-based Services," Computer Networks, Elsevier Science Publishers by; Amsterdam, NL; vol. 31, No. 4; Feb. 25, 1999; pp. 411-424; XP004304491; ISSN: 1389-1286.

(Continued)

*Primary Examiner* — John J Lee
(74) *Attorney, Agent, or Firm* — Brinks Hofer Gilson & Lione

(57) ABSTRACT

A system and method supporting extended network access notification via a broadband access gateway is disclosed. A representative embodiment of the present invention may comprise a wireless interface and may be capable of exchanging multimedia communication between the wireless interface and a broadband network. The gateway may support multimedia communication via access devices that may seamlessly hand off from a wireless wide area network to a personal area network supported by the wireless interface. The hand off may be coordinated by the gateway and the wireless wide area network via the broadband network. A user of an access device may be notified when such a handoff has been automatically initiated, and a user may configure aspects of such hand offs.

20 Claims, 6 Drawing Sheets

U.S. PATENT DOCUMENTS

| | | | |
|---|---|---|---|
| 6,493,875 | B1 | 12/2002 | Eames et al. |
| 2003/0185189 | A1 | 10/2003 | Chitrapu et al. |
| 2004/0008645 | A1* | 1/2004 | Janevski et al. ............... 370/331 |
| 2004/0023669 | A1* | 2/2004 | Reddy ........................ 455/456.1 |
| 2004/0028009 | A1* | 2/2004 | Dorenbosch et al. ......... 370/329 |

OTHER PUBLICATIONS

European Search Report; for application No. EP 05 00 767716, dated Jan. 16, 2007, 3 pages.

* cited by examiner

METHOD AND SYSTEM FOR EXTENDED NETWORK ACCESS NOTIFICATION VIA A BROADBAND ACCESS GATEWAY

CROSS REFERENCE TO RELATED APPLICATIONS

The present patent document is a continuation of application Ser. No. 13/160,264, filed Jun. 14, 2011, pending, which is a continuation of application Ser. No. 12/582,540, filed Oct. 20, 2009, now U.S. Pat. No. 7,962,164, which is a continuation of application Ser. No. 11/021,277, filed Dec. 23, 2004, now U.S. Pat. No. 7,606,570, which claims the benefit of the filing date under 35 U.S.C. §119(e) of Provisional U.S. Patent Application Ser. No. 60/563,894, filed Apr. 16, 2004. All of the foregoing applications are hereby incorporated herein by reference.

BACKGROUND

One major common problem faced by cellular and landline service providers is market competition. In today's climate of competitive markets, cellular service providers have found that one way for them to grow market share and defend their businesses is to be proactive and form alliances, and to partner with landline service providers. In addition, cellular service providers seek to differentiate their service offerings, and to capture the largest portion of market revenue by meeting an ever increasing demand for access to a wide range of media forms such as MP3 encoded audio, still and video imaging, data, instant messaging, and email. In a similar manner, the landline service providers have found that to grow market share and ward off competition, they too must be proactive and form alliances, and to partner with cellular service providers. Support for broad economical access to these converging forms of communication is needed to enable unfettered market growth, and to support the development and use of new handheld devices needed to provide increasing levels of mobile multimedia communication functionality.

Although the formation of alliances and partnerships between cellular service providers and landline service providers may help to ward off competition, such alliances and partnerships are faced with other problems. For example, the erection of cellular infrastructure such as cellular towers may be an expensive venture since this may require acquisition of real estate, whether in the form of outright purchases or through leasing. Cellular infrastructure also requires the establishment of one or more expensive backbone links to handle core network traffic. Another cellular-related problem is that the cellular signals do not penetrate and propagate in buildings such as homes and offices very well. This is especially true with the frequencies that are typically utilized in the United States, which may vary between 800 MHz and 1900 MHz or 1.9 GHz.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY

Aspects of the present invention may be seen in a system supporting mobile user access to multimedia information. Such a system may comprise a gateway communicatively coupled to a broadband network and at least one wireless interface. The gateway may be capable of selectively exchanging multimedia information among the at least one wireless interface and the broadband network, and of communicating with a plurality of access devices via the at least one wireless interface. At least a portion of the plurality of access devices may also being capable of communication via a wireless wide area network. The at least a portion of the plurality of access devices may be capable of handing off multimedia communication from one of the wireless wide area network and the at least one wireless interface to the other in a seamless fashion. The at least a portion of the plurality of access devices may be capable of notifying a user of a status of communication with the wireless wide area network and the at least one wireless interface. In a representative embodiment of the present invention, the multimedia information may comprise at least one of streaming video, broadcast video, digitized audio, data, digitized video, and digitized still pictures. The at least one wireless interface may be compliant with the Bluetooth V1.2 or compatible personal area network (PAN) specification, may be compliant with at least one of the Institute of Electrical and Electronics Engineers (IEEE) 802.11a, 802.11b, 802.11g, and 802.11n standards, and may communicate using an unlicensed frequency band. The at least one wireless interface may communicates at a frequency of approximately 2.4 gigahertz.

In various representative embodiments of the present invention, the broadband network may comprise a digital subscriber line (DSL) network, a cable network, a satellite network, and the Internet. Notifying may comprise displaying a visual indication of the status of communication with the wireless wide area network and the at least one wireless interface, and playing an audible indication of the status of communication with the wireless wide area network and the at least one wireless interface. The gateway may collect access-related information for at least one of the plurality of access devices and the broadband network, and the gateway may manage access to the collected information. In a representative embodiment of the present invention, the gateway and the wireless wide area network may interact to coordinate the transitioning of multimedia communication. The wireless wide area network may comprise a cellular network, and the cellular network may comprise at least one of a global system for mobile communications (GSM) network, a time division multiple access (TDMA) network, a code division multiple access (CDMA) network, and a universal mobile telecommunications system (UMTS) network. The plurality of access devices may comprise at least one of a mobile multimedia handset, a personal digital assistant (PDA), and a personal computer (PC). The plurality of access devices may also comprise at least one of a digital scanner, a digital camera, a printer, headphones, and a pointing device.

Other aspects of the present invention may be found in a method of operating a gateway supporting mobile multimedia communication. Such a method may comprise initializing communication via a broadband network, and collecting, via at least one of a personal area network and the broadband network, information comprising accessibility of at least one access device. The method may also comprise receiving a request to hand off wireless multimedia communication of one of the at least one access device between a wireless wide area network and the personal area network. The method may comprise coordinating with the wireless wide area network, via the broadband network, the hand off of wireless multimedia communication of the one of the at least one access device between the wireless wide area network and the personal area network. The one of the at least one access device may be capable of notifying the user of the hand off. The personal area network may be compliant with the Bluetooth V1.2 or compatible personal area network (PAN) specification, may be compliant with at least one of the Institute of Electrical and Electronics Engineers (IEEE) 802.11a, 802.11b, 802.11g, and 802.11n standards, and may communicate using an unlicensed frequency band. The personal area network may communicate at a frequency of approximately 2.4 gigahertz.

In various representative embodiments of the present invention, the broadband network may comprise a digital subscriber line (DSL) network, a cable network, a satellite network, and the Internet. The wireless wide area network may comprise a cellular network, and the cellular network may comprise at least one of a global system for mobile communications (GSM) network, a time division multiple access (TDMA) network, a code division multiple access (CDMA) network, and a universal mobile telecommunications system (UMTS) network. The multimedia communication may comprise at least one of digitized audio, data, digitized video, and digitized still pictures. The at least one access device may comprise at least one of a mobile multimedia handset, a personal digital assistant (PDA), and a personal computer (PC), and the at least one access device may comprise at least one of a digital scanner, a digital camera, a printer, headphones, and a pointing device.

Still other aspects of the present invention may be observed in a machine-readable storage, having stored thereon a computer program having a plurality of code sections for operating a gateway supporting mobile multimedia communication. The code sections may be executable by a machine for causing the machine to perform the operations comprising initializing communication via a broadband network, and collecting, via at least one of a personal area network and the broadband network, information comprising accessibility of at least one access device. The operations may also comprise receiving a request to hand off wireless multimedia communication of one of the at least one access device between a wireless wide area network and the personal area network. The operations may comprise coordinating with the wireless wide area network, via the broadband network, the hand off of wireless multimedia communication of the one of the at least one access device between the wireless wide area network and the personal area network. The one of the at least one access device may be capable of notifying the user of the hand off. The personal area network may be compliant with the Bluetooth V1.2 or compatible personal area network (PAN) specification, may be compliant with at least one of the Institute of Electrical and Electronics Engineers (IEEE) 802.11a, 802.11b, 802.11g, and 802.11n standards, and may communicate using an unlicensed frequency band. The personal area network may communicate at a frequency of approximately 2.4 gigahertz.

In various representative embodiments of the present invention, the broadband network may comprise a digital subscriber line (DSL) network, a cable network, a satellite network, and the Internet. The wireless wide area network may comprise a cellular network, and the cellular network may comprise at least one of a global system for mobile communications (GSM) network, a time division multiple access (TDMA) network, a code division multiple access (CDMA) network, and a universal mobile telecommunications system (UMTS) network. The multimedia communication may comprise at least one of streaming video, broadcast video, digitized audio, data, digitized video, and digitized still pictures. The at least one access device may comprise at least one of a mobile multimedia handset, a personal digital assistant (PDA), and a personal computer (PC), and the at least one access device may comprise at least one of a digital scanner, a digital camera, a printer, headphones, and a pointing device.

In a representative embodiment of the present invention, the notifying may comprise at least one of displaying a visual indication and playing an audible indication related to the hand off of wireless multimedia communication between the wireless wide area network and the personal area network.

These and other advantages, aspects, and novel features of the present invention, as well as details of illustrated embodiments, thereof, will be more fully understood from the following description and drawings.

DETAILED DESCRIPTION

Aspects of the present invention relate to the seamless merging of wide area networks, from any kind of wired and/or wireless wide area networks, to pockets of wired and/or wireless local area networks and personal area networks, which may be located in homes or other environment such as an office or business. More specifically, aspects of the present invention pertain to the notification of a user of a mobile wireless device of the opportunity to connect to an alternate network connection such as, for example, a personal cellular microcell, a personal area network (PAN), a wired or wireless wide area network (WAN), wireless local area network (WLAN) or other type of network located within a premises such as, for example, a home, office, business, or the like. The merging of these various types of networks may enable transparent communication of all types of media between access devices, which may be coupled in a wired or wireless fashion to one or more of these networks. In an embodiment of the present invention, seamless communication may be provided to access devices as they transition from one type of network to another type of network.

Figure 1:
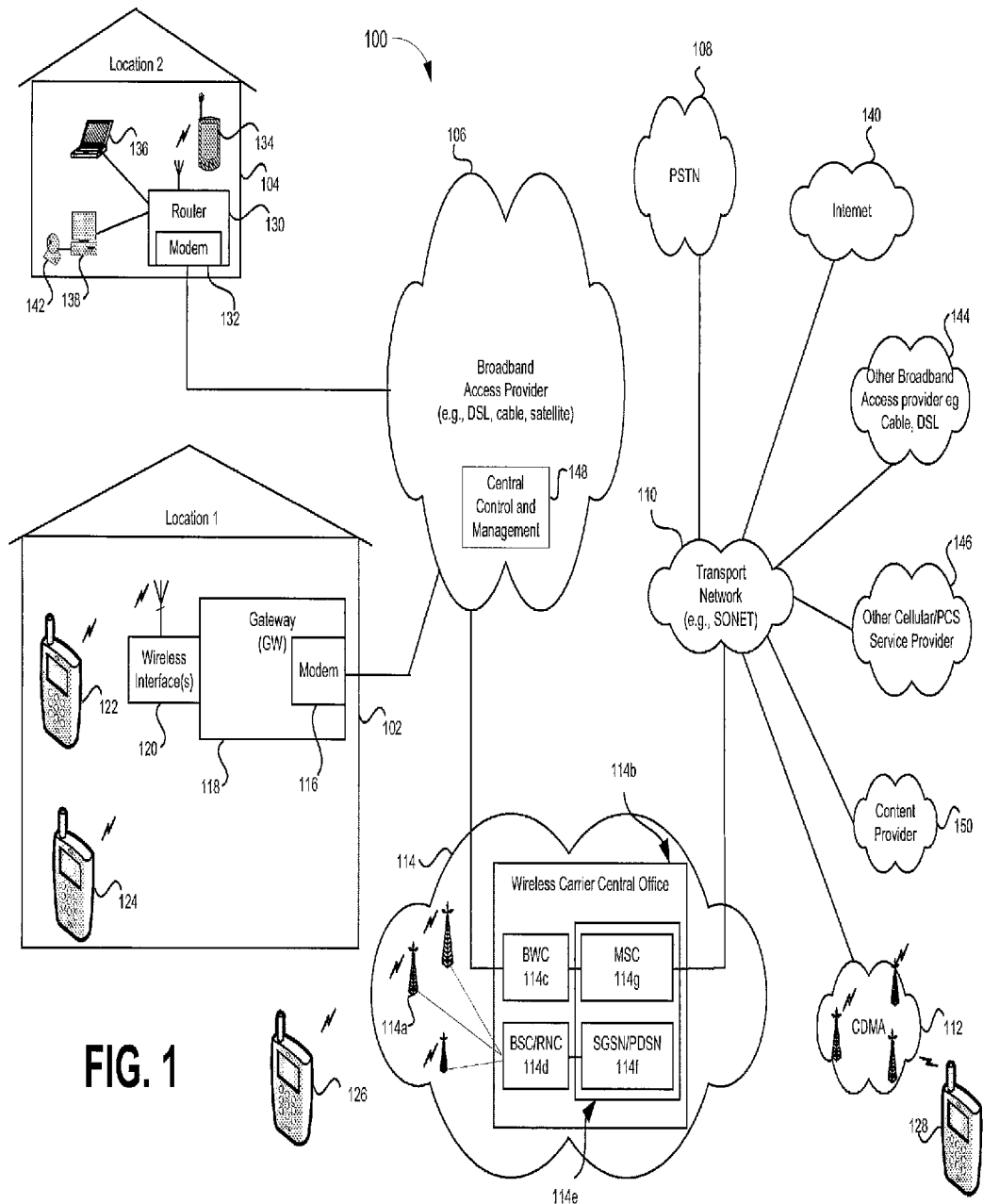
FIG. 1 is a block diagram illustrating an architecture of an exemplary communications system in which a representative embodiment of the present invention may be practiced.

FIG. 1 is a block diagram illustrating an architecture of an exemplary communications system in which a representative embodiment of the present invention may be practiced. Referring to FIG. 1, there is shown a first location 102, a second location 104, a broadband access provider (BAP) 106, public switched telephone network (PSTN) 108, a transport network 110, wireless networks including CDMA network 112 and GSM network 114, and access devices 126 and 128. The first location 102 comprises a gateway 118 having a modem 116, a wireless interface(s) block 120, and the access devices 122, 124. The access devices 122, 124, 126, 128 may comprise, for example, a mobile multimedia handset having a high level of functionality such as, for example, that of one or more of a digital video or still camera, a portable audio (MP3) player, a personal digital assistant, and a voice handset. The access devices 122, 124, 126, 128 may be capable of operating using, for example, a personal area network and/or wireless local area network compliant with, for example, Bluetooth, IEEE 802.11a/b/g/n, and/or IEEE 802.15.3a ultrawideband standards. The second location 104 comprises a router 130 having a modem 132, and a plurality of wireless access devices. The plurality of wireless access devices at the second location 104 may comprise a personal computer (PC) 138, a laptop 136 and a wireless personal digital assistant (PDA) 134. A peripheral such as a digital camera 142 may be coupled to the personal computer 138. Other peripherals such as printers, digital scanners, speakers, and the like, which are not shown, may also be coupled to the personal computer 138 and/or laptop 136. The wireless interface block 120 may comprise a plurality of interfaces such as a Bluetooth interface, an IEEE 802.15.3a ultrawideband interface, and any combination of an IEEE 802.11a, b, g and/or n interface.

FIG. 1 also comprises an "other broadband access provider" block 144, an "other cellular/PCS service provider" block 146, a central control and management block 148, and content provider 150. The "other broadband access provider block 144" may be, for example, a cable, DSL, or other type of broadband access provider. The central control and management block 148 may comprise suitable logic, circuitry and/or code that may be adapted to handle content delivery and security functions such as authentication, validation, key or certificate management, and authorization. The central control and management block 148 may also be adapted to handle provisioning and service management. In a representative embodiment of the present invention, the central control and management block 148 may establish communications links with, for example, the gateway 118, the broadband access provider 106, the other broadband access provider 144, the other cellular/PCS service provider 146, the CDMA network 112, and the GSM network 114 using actual or virtual connections.

The broadband access provider 106 may be, for example, a cable operator, a telephone company, or satellite operator providing Internet access along with other communication services. In instances where BAP 106 is a telephone company, broadband service to locations 102, 104 may be provided via DSL or other broadband access technology. Accordingly, the modems 116, 132 may be DSL modems. In instances where BAP 106 is a cable operator, broadband service to locations 102, 104 may be provided via cable. Accordingly, the modems 116, 132 may be DOCSIS compliant or other type of cable modem. Given the rapid decrease in the cost of leased telephone lines over the past decade or more, the connection to the location 102, 104 may also be T1 or T3 connections. For example, a switch located at a central office (CO) (not shown) may be utilized to couple a T1 or T3 connection between the second location 104 and the PSTN 108.

The gateway 118 may comprise an integrated DSL modem, cable modem or other high-speed modem that may be required for handling a connection such as a T1 or T3 connection. Alternatively, the gateway 118 may be coupled to an external DSL modem, cable modem or other high-speed modem that may be capable of handling connections such as a T1 or a T3 connection. The gateway 118 may be adapted so that it has access to protocol stack information that may be related to the GSM and/or CDMA networks 114, 112, respectively. The gateway 118 may also be adapted to provide protocol support for communication with "other cellular/PCS service provider" block 146.

Each of the CDMA and GSM networks 112, 114 may comprise a plurality of cell sites (a/k/a cellular towers) that are located in geographical cells within each of the networks. Within the GSM network 114, each of the cell sites such as, for example, cell site 114a may comprise a base transceiver station (BTS), and one or more base transceiver stations (BTSs) may be coupled to wireless carrier central office 114b. The wireless carrier central office 114b may comprise a base station controller/radio network controller (BSC/RNC) such as BSC/RNC 114d. One or more base station controllers/radio network controllers (BSCs/RNCs) may be coupled to the core network 114e, that comprises a network edge switch called a mobile switching center (MSC), such as MSC 114g, and a serving GPRS support node (SGSN)/packet data serving node (PDSN) 114f, of the GSM network 114. The mobile switching center may be coupled to, for example, the PSTN 108 via the transport network 110. As an access device moves out of range of a first cell site to within range of a second cell site, the decrease signal power received from the first cell site and the increase in signal power received from the second cell site causes initiation of handoff of a call from the first cell site to the second cell site. In cases where there is no second cell site to handoff to, the call may be maintained by the first cell site power until it is attenuated to a threshold where it is no longer feasible to maintain the call. At the point where the power reaches or falls below this threshold, the call may drop and any related call resources may be relinquished. In a home and/or office environment, it may be desirable to have a second network to which the call may be handed off to.

As an illustration, a user may be on their way home and as the user approaches their home, the signal may fall below a minimum signal power threshold that is required to maintain a call. However, instead of dropping the call, the call may be handed off to, for example, a PAN or a wireless local area network (WLAN) that may be located within the user's home or an unlicensed wireless access system that may be located in the user's home. For example, with reference to FIG. 1, as access device 126 migrates from the vicinity of the serving cell site 114a in GSM network 114 towards the wireless interface 120 in the first location 102, the call may be handed off from the cell site 114a GSM network 114 to the wireless interface 120 coupled to the gateway (GW) 118 at the first location 102. Accordingly, instead of the call being dropped, the call has been seamlessly handed off and is now being handled by the gateway 118 via the wireless interface 120. The resulting wireless data may then be communicated to the GSM network 114 via the broadband connection to the BAP 106 which is connected to the broadband wireless local area network controller (BWC) 114c.

In this illustration, the user is handed off to their PAN, WLAN, or other network located within their home. However, the user could also have been handed off to another network system such as a neighbor's network. In any case, a gateway coupled to the wireless interface which is providing service to the user may communicate at least a portion of the data to, for example, the cable or DSL BAP 106, the GSM network 114, CDMA network 112, other broadband access service provider 144, other cellular/PCS service provider 146 and central control and management block 148. The user may be provided with a notification that indicates the presence of the PAN, WLAN, or other unlicensed network. For example, an icon representative of a personal area network may be displayed on the screen of the access device 126 once a soft or hard handoff is achieved from a serving cell site in GSM network 114 to the wireless interface 120 at the first location 102. A special tone or other audio alert may also be utilized to indicate that the call has switched to the wireless interface 120.

In instances where the gateway 118 detects a compatible access device that may be within the range of the wireless interface 120, the gateway 118 may immediately advertise its available services to the access device. In this regard, the gateway 118 may be adapted to transmit service advertisements to the access device in order to alert a user of the access device of the types of services that are being offered by the gateway 118. Signals containing icons representative of the services may be transmitted to and displayed on a screen of the access device and/or audio alerts may be utilized to notify the user of these services.

In another embodiment of the invention, quality of service (QoS) may also be advertised by the gateway 118. For example, when a user is being serviced by the wireless interface 120, the gateway 118 may advertise that stereo audio is available.

Access devices may be pre-registered so that when they are within the range of the wireless interface 120, the gateway 118 may automatically recognize them. For the pre-registration, an administrator of the gateway 118 at the first location 102 may register access devices that are allowed to access the gateway 118 when they are within the range of the wireless interface 120. Pre-registration may be done prior to the access device accessing the gateway 118. During pre-registration, an administrator or owner of the gateway 118 may enter registration or configuration information such as device IDs of access devices belonging to friends and/or family members into a registration database associated with the gateway 118. As a result, these devices will be allowed to access at least a portion of the services offered by the gateway 118 whenever they attempt to access the gateway 118 by pressing a single button, for example. Opportunistic registration permits a user of an access device to register with the gateway 118 automatically with little or no effort on the part of the user. In this regard, registration information may be sent to the gateway 118 from an access device during an initial access and the gateway 118 may choose to accept or deny the registration. The registration information may be automatically or manually sent to the gateway 118.

In certain instances, an access device may not have been pre-registered to access the network. In this case, one button access may be provided. A single button such as a hard coded button or software-enabled button on an access device may be programmed to transmit identifying information from the access device to the gateway 118. The gateway 118 may utilize this transmitted identifying information to grant or deny access to its services. For example, one button may be programmed to contain access device identifying information related to accessing the services provided by gateway 118 at the first location 102. The gateway 118 may also be adapted to utilize digital certificates to authenticate access devices.

An interactive process may also be provided, whereby the gateway 118 may prompt or request particular information, for example a password from an access device requiring network access. If the particular information is received, then access to at least some of the services provided by the gateway 118 may be granted and if not, the access to at least some of the gateway's services may be denied.

In another embodiment of the invention, the one button access may be provided via software-enabled button (soft button) or hardware-enabled button (hard button). In this regard, the software button may be displayed on a screen of an access device.

A "walled garden" approach may be utilized to provide access to the services that may be offered by a particular gateway, for example, gateway 118. Under the walled garden approach, when an access device first registers or is identified, a basic set of services may be provided by the serving gateway 118 to the access device 124. The basic services offered may vary among each gateway. At least some of the basic services that are provided by a gateway such as gateway 118 may be offered without authenticating the access device 124. However, other services may only be offered if an access device such as access device 124 is properly authenticated. These services that are offered may be services that were advertised by the gateway 118.

In an aspect of the invention, access to additional services may be granted based on, for example, user identity, access device identity and or user input. The services offered to an access device by a gateway may be arranged in a hierarchical structure such as a tier. For example, in a first tier, a user may be prompted to enter membership information such as a member identification number. Upon authentication of the membership identification number, the first tier may provide restricted access with pop-up advertisements that may not be disabled. In a second tier, for example, a user may be prompted to enter a password. Upon authentication of the password, second tier information may provide restricted access to gateway services without pop-up advertisements. In a third tier, for example, entering billing information such as an account number or credit card or check card number may provide unlimited and/or unrestricted access to all the services offered by a gateway. A fourth tier may provide only operating instruction and information for guests.

An administrator of the gateway may establish the type of access provided by the walled garden. For example, if the first location 102 is a hotspot at a Cafe, the provider of the gateway may establish the service access levels or tiers that may be provided by the gateway 118.

When an access device is within the range of the gateway 118, wireless service is handed off from a serving cell site 114a in the GSM network 114 to the gateway 118. The access device may be authenticated by the gateway 118 and permitted to access at least some of the services offered by the gateway 118. Once the access device is authenticated, at least a portion of the information on the access device may be made available as a networked resource via the gateway 118. A user of the access device may choose whether information on the access device may be made available to the gateway and if so, that information which will be made available, and that information which will be unavailable to the gateway 118. In this regard, where information is made available, the gateway 118 may maintain a list of the resources that may be available on access devices that may be coupled to the gateway 118. For example, a list of contact information, calendar information, audio files, video files and/or data files stored on the access device may be sent to the gateway 118.

The resources that are available on the access device may also be advertised to other access devices that may be in communication with the gateway 118. Advertisement of the resources that may be available on an access device may be restricted to, for example, a list of particular devices, a particular type of devices or to a particular user. Accordingly, a user may have to be properly authenticated prior to certain information being made available to the user. Additionally, advertisement of the resources may cause certain icons representative of the resources to be displayed on other access devices. In a similar manner, icons representative of the resources that may be available on these other access devices may also be presented on the access device.

An access device may be provided with a welcoming screen that may allow a user of a device to sign up for either free or paid services. Once the signup is complete, subsequent access by the user may be authenticated by the gateway 118 utilizing the signup information. Whenever an access device registers with and/or is authenticated by the gateway 118, information on the access device may be updated and/or synchronized with information that may be on the gateway 118.

Devices within the location of the gateway 118 may be configured to register certain portions of their data content with the gateway 118 through a gateway registration process. Once data for these devices is registered to the gateway 118, the gateway may maintain a database, which keeps track of the data that is available, and its location. Accordingly, if the data previously stored in the database is no longer available, then information representative of the previously stored data may be removed from the database. Data from devices coupled to the gateway 118 such as on laptops, CD players, digital video disk (DVD) players, TIVO, personal video recorders (PVRs), personal digital assistants (PDAs) and other devices, may be registered with the gateway 118. This data may comprise audio, video, still pictures, and/or text.

At least a portion of the registered data may be made available to other network access devices via the gateway 118. In an aspect of the invention, the gateway 118 may be adapted to maintain a searchable list of data that may be available via the gateway. In this regard, the gateway may comprise a search engine that may be utilized to locate and distribute data that may be made available through the gateway 118. In another aspect of the invention, data may be made available to access devices via advertising by the gateway 118. Access devices may be configured to seek out particular data that may be of interest. Accordingly, an access device may be adapted to receive and process only those gateway advertisements may fit particular criteria. Those advertisements that may not fit the particular criteria may be discarded or ignored.

When an access device is within the range of the gateway 118, wireless service may be handed off from a serving cell site 114a in the GSM network 114 to the gateway 118. The access device may be authenticated by the gateway 118 and permitted to access at least some of the services offered by the gateway 118. Once the access device is authenticated, a user of the access device may have a desire to locate a particular video presentation. The user may access the search engine, which may have been advertised to the user's access device by the gateway 118. The search engine may appear on the display of the user's access device as an icon. The user may then activate a search by selecting the search engine icon, inputting a name of the video presentation and executing the search.

In another embodiment of the invention, the gateway may be adapted to classify information based on a given criterion. This classification may assist with locating information based on a particular criterion. In this regard, a user of the access device may be presented with a list of classifications and may select one, which may be of interest based on a particular criterion. This may narrow the focus of a search.

The gateway may also be utilized to facilitate seamless synchronization of data between devices that may be wired or wirelessly coupled to the gateway 118. For example, audio files located in a music folder on a PC coupled to the gateway 118 may be synchronized with a wireless media player coupled to a hot spot in an airport while a user of the wireless access media player waits to board a flight. In this regard, the gateway may determine what files need to be synchronized and control how the synchronization is accomplished. The same is true for files that may be downloaded from the PC to the wireless access media player, and for files that may be uploaded from the wireless access media player to the PC. Calendar and/or contact information may also be updated and/or synchronized with a mobile multimedia handset in a similar manner utilizing the gateway 1A location-aware service determines an approximate location of a network device and adapts delivery of a particular service application and/or content according to a quality of service criterion. The delivery of location-aware services may be controlled by the gateway 118. For example, a user of an access device may request playback of an audio clip via the gateway 118. After receiving the request for playback of the audio clip, the gateway 118 may determine that a channel between the gateway 118 and the user's access device may only be capable of maintaining a reduced playback rate. As a result, instead of sending 128 kbps encoded audio data, then the gateway may send 96 kbps data. Hence, in a case where the audio data was originally stored in 128 kbps sampled audio data, then the gateway 118 may transcode the 128 kbps sampled data to 96 kbps audio data.

In another illustrative embodiment of the invention, while the GSM network 114 is servicing the access device, lower compression rates may be utilized to provide service to the access device. However, when the access device roams within range of the wireless interface 120 and is being served by the gateway 118 through wireless interface 120, higher compression rates may be utilized. For example, audio data sampled at a data rate of 64 kbps may be utilized for playback on an MP3 enabled telephone while the phone is being serviced by a cell site 114a in the GSM network 114. However, once the MP3 enabled telephone is within the operating range of the wireless interface 120 and is being serviced by the gateway 118, the gateway 118 may automatically adapt to a higher data rate of, for example, 92 kbps or 128 kbps.

Automatic format conversion by the gateway 118 may include converting data from a first format to at least a second format suitable for delivery and/or display on an access device. This may permit data that would otherwise be incompatible with a first access device to be played on that first access device. For the location-aware services based on QoS, data was converted from a first format 128 kbps to a second format 96 kbps to achieve and/or maintain a particular QoS, but the data type remained the same. In this case, the audio format and/or its data type may be different. For example, if the audio format was MP3, then after the conversion, the format remained WAV and/or the sampling rate may have decreased from 128 kbps top 96 kbps.

In conventional wired caller ID systems, a name and/or directory number (DN) of a calling party may be transferred either in-band or out-of-band to a called party and may be displayed on the called party's caller ID display when a call is answered. In these conventional systems, the caller ID information is limited to a caller's name, directory number (DN), general location and/or time of call. In wireless telephone systems, in order to save on bandwidth, only a caller's directory number is transferred and displayed to a calling party. However, if the calling party's directory number and name is stored in the called party's phone, then the stored name and stored directory number will be presented on a display of the called party's terminal. In this case, the stored directory number is compared with the transferred caller's directory number, and if a match occurs, then a name corresponding to the matching directory number is also displayed on the called party's terminal.

In accordance with an embodiment of the invention, the gateway 118 is adapted to determine the appropriate caller ID information that may be displayed in a called and/or calling party's caller ID. In this case, reverse caller ID information may be displayed on both a calling and a called party's terminal by the gateway 118.

If a called and/or calling device is a mobile multimedia handset and/or laptop, for example, contact or other personal information may be displayed the caller's and/or calling party's directory number. The level or amount of information that may be displayed may be varied. Certain sensitive information relating to either the called or calling party may be restricted from being displayed.

In current cellular communication systems, over the air (OTA) programming is utilized to program a cellular telephone during the provisioning process. In some instances, cellular providers have established websites that may be utilized or OTA programming. In this regard, a cellular subscriber may access the website and enter information such as the assigned directory number and the electronic serial number of the cellular telephone being programmed.

In accordance with a representative embodiment of the invention, an access device may be registered using over the air programming via the gateway 118. A user of an access device may send access device information to the gateway 118 using, for example, a default interface that may be presented to and displayed on a screen of the access device when the access device first enters the service area of the wireless interface 120. During registration, the capabilities of an access device may be sent to the gateway 118 and may be shared with devices that may be coupled to the gateway 118.

Since the gateway acts as a registrar of information for all the access devices that may be wired or wirelessly coupled to it, the gateway may function as a personal digital assistant for any of these access devices. In an illustrative example, a first device, a first PC and a second PC are being serviced by the gateway 118. The first access device receives a call and the caller ID information shows the caller's name, home directory number and home address. However, the first PC contains the business address for the caller and the second PC contains the monthly calendar information for the caller. Assume that the caller had a desire to setup a business meeting. In accordance with an aspect of the invention, the gateway 118 may be adapted to provide the business address of the caller to the first access device and also provide the caller's calendar to the first access device. In this manner, the network centrally provides all the information necessary for scheduling the meeting. In this example, the first PC may belong to the user of the first access device and the second PC may belong to the caller.

This concept may be extended to a look-up or 411 directory assistance on the Internet. The lookup may also be location dependent. In this regard, if a user is located in Hollywood and requests a hotel location, the gateway 118 may only cause the hotels that are located in Hollywood to be displayed to the user.

The gateway 118 may also be adapted to create profile information based on data usage. These created profiles may be utilized to create social networks for people having common interests. Accordingly, users may be permitted to post their interests and also select those people having similar interests based on the created profile. Based on the created profile information and the posted user interests, the gateway 118 may also generate a list of those people who have similar interest and also those users that may potentially have similar interests.

Given the capability to seamlessly operate an access device as one migrates from outside the home into the home, it is desirable to have a single device that may be adapted to control at least some of the devices that may be found within the home. In addition to its normal voice or data communication operating mode, an access device may be configured to operate as a universal remote that may be utilized to remotely control a plurality or other devices such as a TV, DVD, CD, Stereo, display monitor, or a combination thereof. Most access devices currently have an IR transmitter, which may be adapted to communicate with other IR receiver devices.

The access device may be used for wireless communication and for remotely controlling an electronic device with as a TV, CD/DVD recorder/player, or other device. The access device may also include at least one soft-button that may be enabled through the gateway 118 and may be utilized to control any other device that may be coupled to the gateway 118.

The gateway 118 is adapted to virtually aggregate data that may be visible from a plurality of access devices or other network devices. Although the gateway 118 may be adapted to store some service and content related information, the gateway 118 does not actually store copies of data that resides the access devices and/or other network devices that may be wired or wirelessly coupled to it. However, the gateway 118 may store, for example, metadata information that may be utilized to locate and access the information stored on the access devices and/or other network devices. The gateway is therefore adapted to function as a registrar of both service and content related information.

Whenever an access device registers with and/or is authenticated by the gateway 118, information may be collected from the access device and related metadata information may be updated and/or synchronized with information that may be currently stored on the gateway 118. Additionally, when a device is no longer being serviced by the gateway 118, associated information may be released from the gateway 118. In this regard, the virtual aggregations function performed by the gateway 118 guarantees that the most current information is accessible from the access devices.

Figure 2:
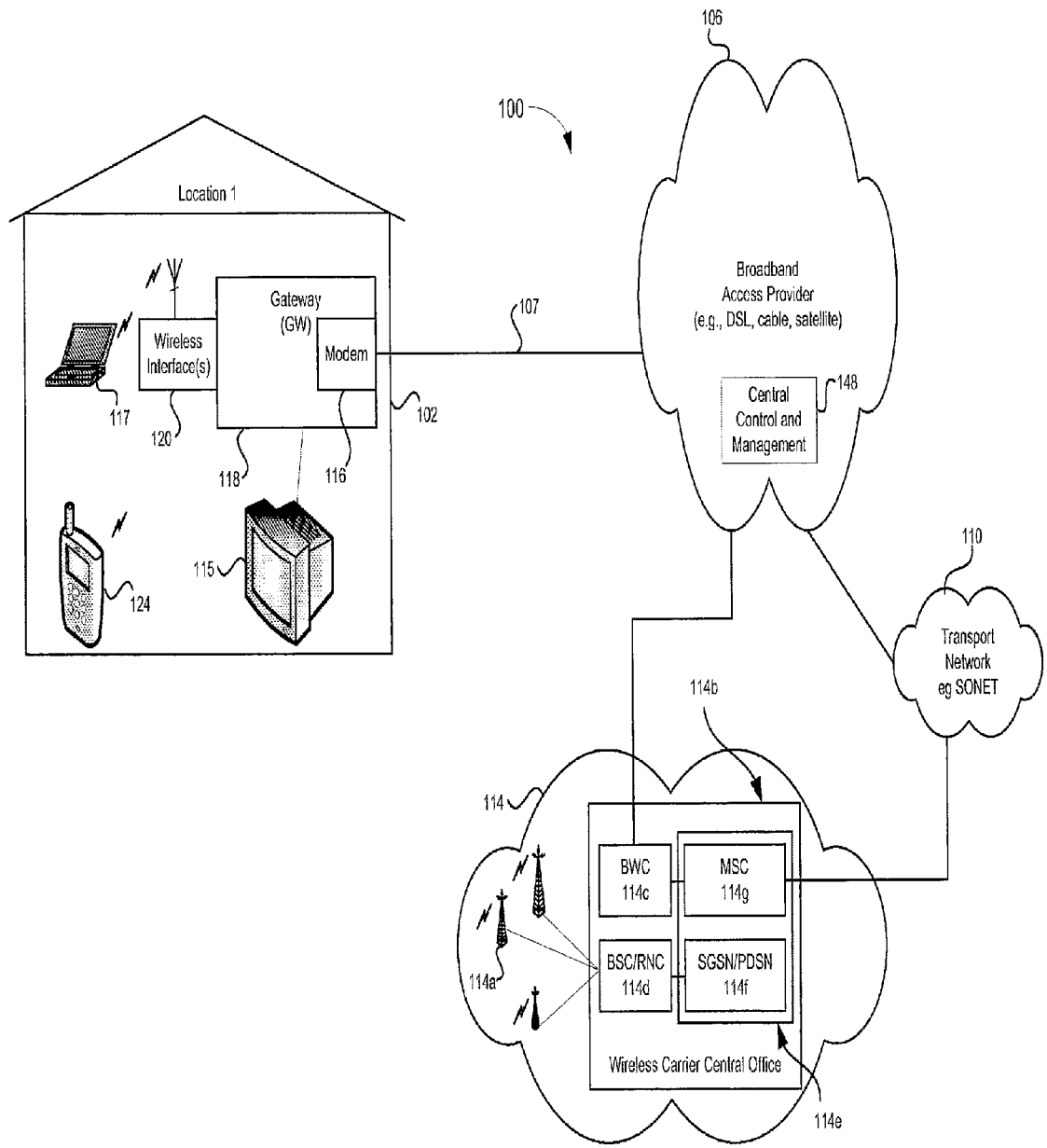
FIG. 2 shows a block diagram illustrating an exemplary communication network, in accordance with a representative embodiment of the present invention.

FIG. 2 shows a block diagram illustrating an exemplary communication network 100, in accordance with a representative embodiment of the present invention. The communication network 100 shown in FIG. 2 comprises a wireless interface 120, and a gateway (GW) 118 with a modem 116, at a location 102. An access device such as access device 124 may be mobile, and may move between the personal area network/wireless local area network coverage provided by wireless interface 120, and the wide area network coverage provided by, for example, GSM network 114. The access device 124 of FIG. 2 may correspond, for example, to the access device 124 of FIG. 1. The location 102 may, for example, be the home of the user of the access device 124, the home of a friend or relative of the user of access device 124, or an office, business, etc., where the user of access device 124 may travel. In a representative embodiment of the present invention, the gateway 118 may comprise, for example, a set top box that may be coupled in a wireless or wired fashion to access devices such as, for example, a laptop computer or television, such as the laptop 117 and the television 115 of FIG. 2. Access to communication bandwidth of a broadband network as previously described may be provided to location 102 by the gateway 118 and the modem 116 shown in FIG. 2. The modem 116 is shown connected to a broadband access provider (BAP) 106 via a broadband connection 107. The broadband connection 107 may comprise, for example, a digital subscriber line (DSL) connection, a cable network connection, a satellite connection, a T1 or T3 network connection, or similar broadband communication link. The modem 116 is compatible with the broadband connection 107, and may be, for example, a DSL modem, a DOCSIS-compliant cable modem, a satellite service modem, or T1 or T3 compatible modem-type device. The broadband connection may provide access through BAP 106 and transport network 110 to, for example, GSM network 114.

In the example illustration of FIG. 2, a user of the access device 124 may or may not be engaged in communication with another system or subscriber accessible via the GSM network 114. Although the present example describes operation with respect to the GSM network 114, a representative embodiment of the present invention may be employed with respect to other wide area networks such as, for example, the CDMA network 112 and other cellular/PCS service provider 146 shown in FIG. 1.

In a representative embodiment of the present invention, the access device 124, or the gateway 118 and wireless interface 120, or a combination of the above may determine at some point that signal conditions permit the establishment of an acceptable communication path between the access device 124 and the wireless interface 120. The determination may be based, for example, upon a signal strength, signal-to-noise ratio, physical location or distance, an error rate, or any combination of the above. The types of parameters used and the conditions under which a communication path may be established may be provided to the access device 124 and/or the gateway 118 and wireless interface 120, by the central control and management block 148. Such parameters and conditions may be defined when service for the user of access device 124 from GSM network 114 is provisioned, or at a later time. When a handoff of service is determined to be appropriate, the access device 124 may, for example, communicate to GSM network 114 a desire to commence service through wireless interface 120 and gateway 118, and to cease over-the-air service via the wireless infrastructure of GSM network 114 such as, for example, cell site 114a. A representative embodiment of the present invention may simply notify the user that a handoff to a PAN/WLAN supported by the gateway 118 and wireless interface 120 is viable, or may notify the user that a handoff has or is about to take place. This notification may, for example, take the form of an audible tone or synthesized speech alert, a visual indication such as an icon, text, or illuminated indicator, or may be a combination of both audible and visual indications. Such an indication may be based upon a prior defined association of the user of access device 124, and the gateway 118 and wireless interface 120 at location 102. The association may be for access devices operated or subscribed to by the owner of location 102, or for friends, family, etc. The association of an access device such as the access device 124, and a gateway such as gateway 118, may be established at the time that service from the operator of the GSM network 114 began, or at some later time. Information about the association available to access device 124 may be provisioned by the subscriber into access device 124, into the gateway 118 and wireless interface 120, in either a direct manner at the devices, or via, for example, short message service (SMS), over-the-air parameter administration (OTAPA) or other data services from the central control and management block 148.

Figure 3:
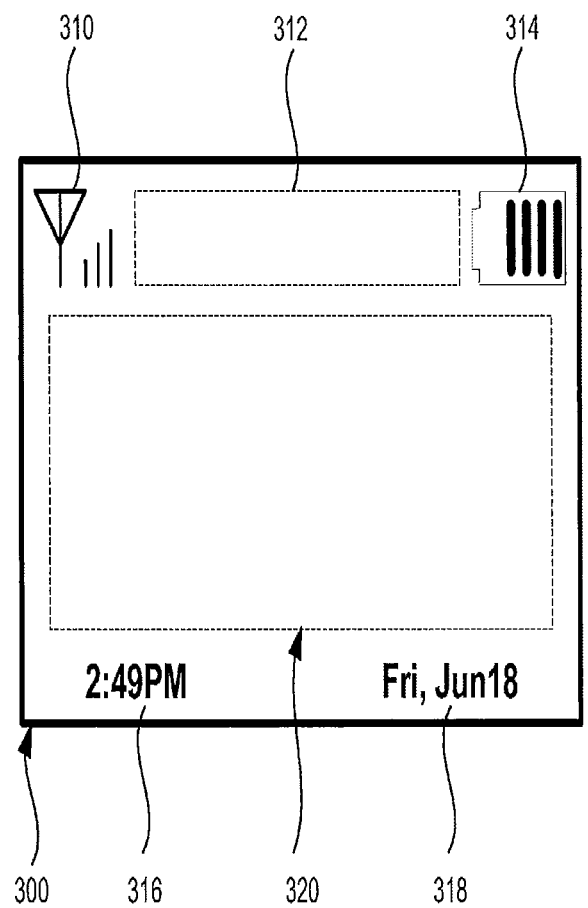
FIG. 3 shows an illustration of a display of an exemplary access device that may correspond to the access device of FIGS. 1 and 2, for example, in accordance with a representative embodiment of the present invention.

FIG. 3 shows an illustration of a display 300 of an exemplary access device that may correspond to the access device 124 of FIGS. 1 and 2, for example, in accordance with a representative embodiment of the present invention. The display 300 of FIG. 3 comprises a network indicator 310, a network services indicator area 312, a battery life indicator 314, a time of day indicator 316, and a day and date indicator 318. The battery life indicator 314 is arranged to show the charge left in the batteries powering the access device, the time of day indicator 316 shows the time of day, and the day and date indicator 318 shows the current day and date. The display 300 may also comprise a display area 320 (shown in FIG. 3 without content) to allow the access device having display 300 to show graphical or textual information for a variety of reasons and from a number of sources.

In a representative embodiment of the present invention, as shown in the illustration of FIG. 3, the visibility of an icon such as, for example, the antenna icon shown as the network indicator 310 may indicate that the access device 124 is currently operating in a mode permitting communication via a wide area network (WAN) such as, for example, the GSM network 114 or CDMA network 112 of FIG. 1, and that WAN signals of acceptable strength or quality have been detected. The series of lines next to the antenna icon may represent the strength of the received WAN signal. Multimedia information and services that are available may be represented by icons with the network services indicator area 312. The appearance of the antenna icon in the network indicator 310 may represent to the user that the multimedia information and services that are available may be limited or restricted according to the capabilities of the WAN. Note that the indication and the availability of any services may be qualified by the ability of the access device 124 to support the service using the capabilities of the WAN.

Figure 4:
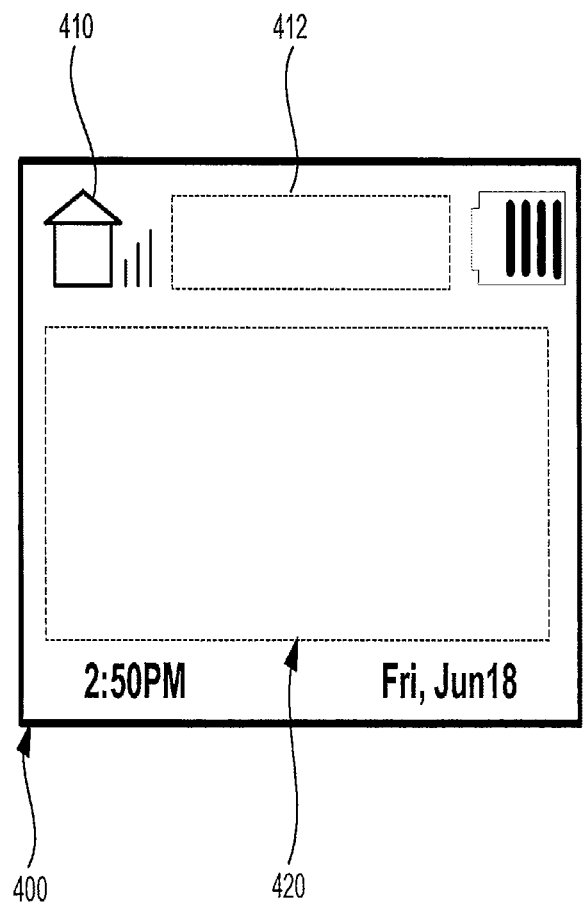
FIG. 4 shows an illustration of a display of an exemplary access device that may correspond to the access device of FIGS. 1 and 2, for example, in accordance with another representative embodiment of the present invention.

FIG. 4 shows an illustration of a display 400 of an exemplary access device that may correspond to the access device 124 of FIGS. 1 and 2, for example, in accordance with another representative embodiment of the present invention. As shown in FIG. 4, the display 400 comprises a network indicator 410, a network services indicator area 412, and a battery life indicator, time of day indicator, and day and date indicator similar in form and function to those shown in FIG. 3. The display 400 may also comprise a display area 420 (shown without content) to allow the access device having display 400 to show graphical or textual messages for a variety of reasons and from a number of sources.

In the representative embodiment shown in the illustration of FIG. 4, the visibility of the house icon as the network indicator 410 indicates that the access device 124 is currently operating in a mode permitting communication via a personal area network (PAN) or wireless local area network (WLAN) such as that supported by, for example, the wireless interfaces 120 of FIGS. 1 and 2, and that PAN/WLAN signals of acceptable strength or quality have been detected. The series of lines next to the house icon of the network indicator 410 may be used to represent the strength of the received PAN/WLAN signal. Changes in the state of the network indicator 410 may be accompanied by an audible indication, to bring changes in network conditions to the attention of the user. Note that although the house icon in the network indicator 410 and the antenna icon in the network indicator 310 of FIG. 3 may be arranged to alternately occupy the same portion of the displays 300, 400, they may also appear in separate areas of the displays 300, 400.

In a representative embodiment of the present invention, the availability of multimedia information and services represented, for example, within the network services indicator area 412 of FIG. 4, or elsewhere on the display 400, may be limited to those able to be supported via the PAN/WLAN serving the access device 124. Various aspects of access to multimedia information and service via a PAN/WLAN may be different from that available via a WAN. For example, a user of an access device within the service area of a PAN/WLAN may have access to or use of information and services requiring higher levels of bandwidth that cannot be supported via a WAN. Entering into or leaving the coverage area of the PAN/WLAN supported by a broadband access gateway such as, for example, the gateway 118 of FIG. 2 may cause the complement of services to change, the quality of services, and the cost of services to change, for example, and may result in user notification of such changes.

Figure 5:
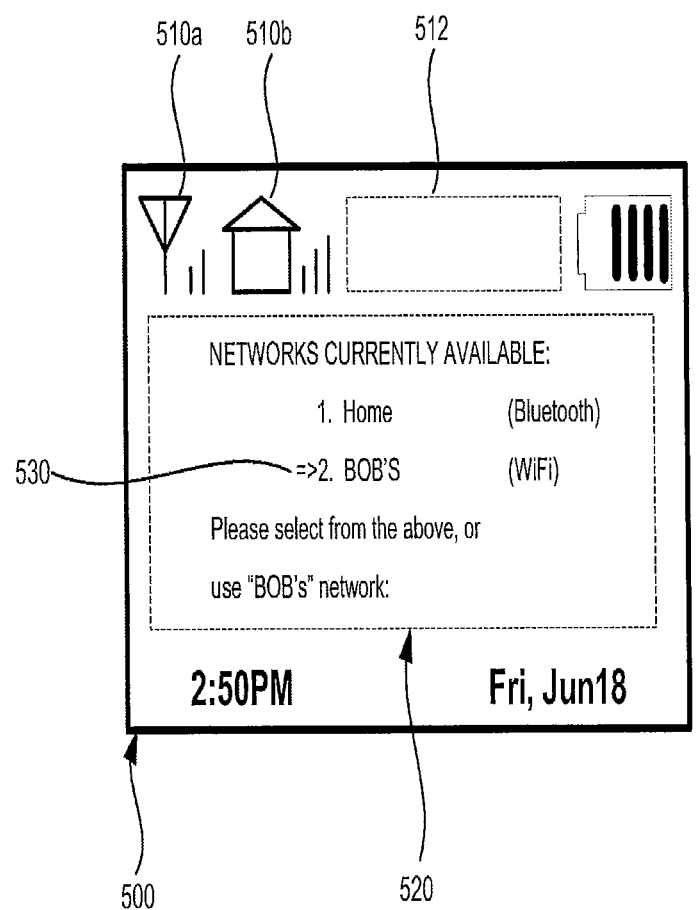
FIG. 5 shows an illustration of a display of an exemplary access device that may correspond to the access devices of FIGS. 1 and 2, for example, in accordance with another representative embodiment of the present invention.

FIG. 5 shows an illustration of a display 500 of an exemplary access device that may correspond to the access devices 124 of FIGS. 1 and 2, for example, in accordance with another representative embodiment of the present invention. As shown in FIG. 5, the display 500 comprises a wide area network indicator 510a, a personal area network indicator 510b, a network services indicator area 512, and a battery life indicator, time of day indicator, and a day and date indicator similar in form and function to those shown in FIGS. 3 and 4. The display 500 may also comprise a display area 520 to allow the access device having display 500 to show graphical or textual messages for a variety of reasons and from a number of sources.

In the representative embodiment of the present invention shown in the illustration of FIG. 5, the visibility of the antenna icon in the wide area network indicator 510a indicates that the access device 124 is currently detecting the presence of a wide area network (WAN) such as, for example, the GSM network 114 or CDMA network 112 of FIG. 1, and that WAN signals of acceptable strength have also been detected. As in the illustration of FIG. 3, the series of lines next to the antenna icon of wide area network indicator 510a may, for example, represent the strength or quality of the received WAN signal. In addition, the visibility of the house icon in the personal area network indicator 510b may, for example, indicate that the access device 124 is currently detecting the presence of a personal area network (PAN) or wireless local area network (WLAN) such as that supported by, for example, the wireless interfaces 120 of FIGS. 1 and 2, and that PAN/WLAN signals of acceptable strength have been detected. The series of lines next to the house icon of personal area network indicator 510b may, for example, represent the strength or quality of the received PAN/WLAN signal. Changes in the state of the wide area network indicator 510a and/or personal area network indicator 510b may be accompanied by an audible indication, to capture the attention of the user.

Although icons and signal strength indications are provided for only one WAN and one PAN/WLAN on the display 500 shown in FIG. 5, the present invention is not limited in this regard. Additional icons, signal strength indicators, and graphical symbols or indications for other, related conditions for additional networks supported by an access device such as, for example, the access device of 124 of FIG. 1, may also be shown on display 500 of FIG. 5. In the representative embodiment of the present invention illustrated in FIG. 5, the detection of acceptable signals from more than a single WAN, WLAN, or PAN may result in the activation of other indicators on display 500. The use of unique visual or audible indications for each of the networks for which access device 124 may be provisioned or have access may permit a user of the access device to be continually aware of network conditions and access options. In addition, information such as, for example, a list of available networks and information related to each of the available networks may be presented in the display area 520 of display 500. For example, the display 500 of FIG. 5 shows that both the wide area network indicator 510a and the personal area network indicator 510b are visible, and that the display area 520 contains a list of currently available networks. Each of the entries in the list shown in display area 520 includes a type of network (e.g., "Bluetooth" and "WiFi"). Additional information such as, for example, signal strength, physical distance and/or location, signal and/or network quality indicator, cost of use, current network load, network transit time or round trip delay, may also be listed for each network currently available to the access device 124.

A representative embodiment of the present invention may request and wait for manual user selection from a list such as that shown in the display area 520 of FIG. 5, before accessing a network. Another representative embodiment according to the present invention may perform an automatic selection of a network, and may include a user option to override automatic selection. As shown in the illustration of FIG. 5, the network listed as "BOB'S" has been marked with a selection indicator 530, signaling that it is the automatically selected network to be used. This network selection may be based upon a variety of factors including, for example, quality of service, cost, signal strength, signal-to-noise ratio, physical proximity, an error rate, level of privacy provided, maximum range, network loading, or variety of other factors, including those mentioned above. Once a selection is made, subsequent accesses or handoffs may be made using a selected network, for as long as that network is accessible. In other representative embodiments of the present invention, notification of the user and selection of the network to be used may be based upon a continual evaluation of the signals from the available networks, and a change of network may be made based upon, for example, not only the metrics described above, but also user preferences. The nature of the notification of the user of availability and/or handoff may, for example, be based upon the metrics and preferences of the user of an access device such as access device 124, and/or upon parameters established by the central control and management block 148.

In a representative embodiment of the present invention, a user of an access device such as the access device 124 of FIG. 2 may move to/from the coverage area of a WAN such as, for example, the GSM network 114 of FIG. 2, from/to the coverage area of a PAN/WLAN supported by a broadband access gateway such as, for example, the gateway 118 of FIG. 2. Due to differences in the capabilities of the PAN/WLAN and WAN, various aspects of access to multimedia information and services by the access device 124 may change. For example, a WAN such as, for example, the GSM network 114 may support communication at lower levels of bandwidth than may be available via the gateway 118. The levels of bandwidth available via the WAN may not allow certain modes of communication such as CD quality audio or full motion video, for example. A user moving from WAN service into an area having service via the PAN/WLAN of a broadband access gateway may then be able to access multimedia information and services that were not available via the WAN, and may be notified via the access device in use. A broadband access gateway in accordance with a representative embodiment of the present invention may communicate with, for example, a broadband wireless controller or a central control and management function such as, for example, the BWC 114c and central control and management function 146 of FIG. 2, to detect changes in the complement of services, or quality level of available services that may be available to the user of the access device.

In a representative embodiment of the present invention, for example, a user of an access device may subscribe to a music service, and may be enjoying that service via a wide area network such as, for example, the GSM network 114 using an access device such as, for example, the access device 124 that is a mobile multimedia handset, at a quality of service equivalent to commercial, over-the-air broadcast-quality stereo. While listening, the user may move into the coverage area of a broadband access gateway such as, for example, the gateway 118 of FIG. 2. Upon arrival with the coverage area of the gateway 118, the user of the access device 124 may, for example, be notified of the availability of CD-quality stereo programming via the gateway 118. In one representative embodiment of the present invention, the user may already be subscribed to receive a CD-level quality of service, and may be automatically switched to the higher level of service. In another representative embodiment of the present invention, the user may be notified of the cost of such service, and may be prompted to pay for the higher quality of service level. In yet another representative embodiment, the user may be required to provide security information identifying the user to the gateway 118, the BWC 114*c*, and/or the central control and management function 148, in order to enable the higher quality of service. In a similar fashion, a representative embodiment of the present invention may manage access to many different forms of multimedia information and services such as, for example, digitized audio, data, digitized still images, digitized video, or any combination thereof.

In a representative embodiment of the present invention, a user of an access device in communication with a broadband access gateway such as, for example, the laptop 117 and the gateway 118, respectively, may be engaged in a multimedia call, and may elect to move from the coverage area of the gateway 118 to the coverage of a wide area network (WAN) such as, for example, the GSM network 114. Movement of the user with laptop 117 from the coverage area of the gateway 118 into the coverage area of the GSM network 114 may be detected by the laptop 117, the gateway 118, the GSM network 114, or any combination thereof. Handoff of the laptop 117 from the service of the gateway 118 to the service of the GSM network 114 may be coordinated by the gateway 118, the BWC 114*c*, and/or the central control and management function 146, for example. During the handoff process, it may be recognized that the GSM network 114 is not capable of providing the quality of service provided by the gateway 118. In one representative embodiment of the present invention, the user of the laptop 117 may be notified that aspects of the call may change during handoff. In another representative embodiment, the user may be notified that additional costs may be incurred as a result of the handoff to the GSM network 114, and may be given the option to change the nature of the call (e.g., reduce the quality of service, drop some media forms, etc.), or to incur the additional charges. The user may also be requested to provide security information authorizing use of the GSM network 114.

Using a representative embodiment of the present invention, a user of an access device like access device 124 being served by a WAN such as, for example, the GSM network 114 may be engaged in a conference call, and may move from the serving area of the GSM network 114 to the coverage area of the PAN/WLAN supported by the gateway 118 and wireless interface 120. Although other participants in the conference call may be exchanging multiple forms of media (e.g., audio-visual materials, text, data, applications files, etc.), the user of the access device 124 may be limited by the capabilities of the GSM network 114 (i.e., the serving WAN) and/or the capabilities of the access device 124, to only the speech portions of the call. The appearance of the access device 124 within the coverage area of the gateway 118 may cause the gateway 118, the central control and management function 148, the BWC 114*c*, or any combination thereof to initiate a handoff of the access device 124 from the GSM network 114 to the PAN/WLAN supported by the gateway 118. During this handoff, the multimedia nature of the conference call may be recognized, and it may be determined that the user of the access device now has the ability to participate in the multimedia aspects previously unavailable from the GSM network 114. Aware that the access device 124 of the user is within the coverage area of the wireless interface 120 of gateway 118, the central control and management function 148, and/or the BWC 114*c* may coordinate with the gateway 118 to notify the user of available aspects of the call via any suitable access device accessible to the gateway 118. This may include, for example, the access device 124, the laptop 117, and the television 115 at location 102 of FIG. 2. The user of the access device 124 may then elect to take part in the additional multimedia components of the call using, for example, the laptop 117 or the television 115, or by using any other suitable access device in communication with the gateway 118, including the access device 124. For example, the user may be informed that the conference call may be continued via the laptop 117, the television 115, or other access devices capable of handling the call and in communication with the gateway 118. A user may be prompted to indicate the access device through which the call will continue, and may be requested to provide security or other information to enable the handoff and change in quality of service. In various representative embodiments of the present invention, changes in cost of service, level of authentication or authorization required, and quality of service, for example, may be provided to the user before the handoff of the call.

Figure 6:
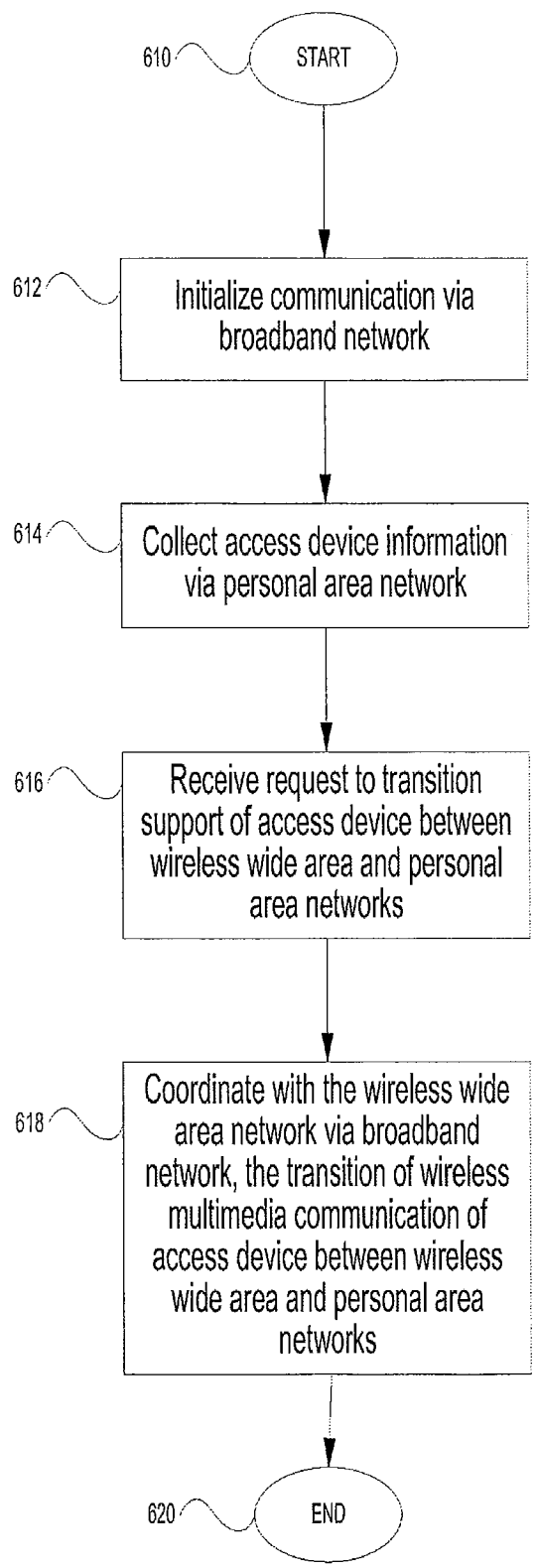
FIG. 6 shows a flowchart illustrating an exemplary method of operating a gateway supporting multimedia communication such as the gateway of FIGS. 1 and 2, for example, in accordance with a representative embodiment of the present invention.

Although the above describes an example of a change of wireless service during an active conference call, a representative embodiment is not limited in this regard. For example, as described above, multimedia information and service access by an access device may be restricted by the limitations of a serving WAN network such as, for example, the GSM network 114. However, upon entry into the coverage area of a wireless broadband access gateway such as, for example, the gateway 118, the access device may be provided with increased communication bandwidth. By enabling access to multimedia information and services FIG. 6 shows a flowchart illustrating an exemplary method of operating a gateway supporting multimedia communication such as, for example, the gateway 118 of FIGS. 1 and 2, in accordance with a representative embodiment of the present invention. The following description of the exemplary method of FIG. 6 makes reference to the elements of FIGS. 1 and 2. The method illustrated in FIG. 6 begins following the starting of the gateway 124 (610). The method then initializes communication via a broadband network such as, for example, a DSL, cable, or satellite network connecting gateway 124 to BAP 106 (612). Initializing communication may comprise, for example, establishing physical and higher layer connectivity to network resources, servers, and other entities. Next, a gateway in accordance with the present invention may collect access device information via a personal area network such as, for example, the personal area network/wireless local area network supported by the wireless interface 120 (614). Such information may, for example, comprise information identifying the location, type, size, origin and/or owner, and restrictions for access. The gateway may, at some later point in time, receive a request to transition support of an access device between a wireless wide area network such as, for example, a cellular network, and the personal area network (616). The access device may correspond, for example, to the access devices 122, 124, 126, 128 shown in FIGS. 1 and 2, and may comprise, for example, a mobile multimedia handset, a personal digital assistant, or a personal computer, to name only a few. The gateway may then coordinate with the wide area network, via the broadband network, the handoff of wireless multimedia communication of the access device between the wireless wide area network and the personal area network/wireless wide area network (618). The coordination of such a handoff may involve, for example, the communication information between the gateway and the wireless wide area network, the personal area network/wireless local area network, and the access device. The access device may notify the user of the access device regarding the handoff of support. The method as shown in FIG. 6 then ends (620).

In various representative embodiments of the present invention, the personal area network and wireless local area networks may include data networks such as, for example, a Bluetooth network, an Institute of Electrical and Electronics Engineer (IEEE) 802.11a/b/g/n compliant wireless network, and/or an IEEE 802.15.3a ultrawideband network such as those located in homes, hot spots or an office. Such local area networks may operate in unlicensed radio frequency spectrum such as in, for example, the 2.4 and 5 gigahertz regions. Examples of wide area networks may include cellular digital packet data (CDPD), voice and data networks such as public switched telephone networks (PSTN), Global System For Mobile Communication (GSM), GSM General Packet Radio Service (GPRS), GSM Short Message Service (SMS), GSM Enhanced Data Rates For Global Evolution (EDGE), North American Time Division Multiple Access (TDMA), iDEN, Code Division Multiple Access (CDMA) and CDMA2000, Universal Mobile Telecommunications System (UMTS) network, to name only a few.

In a representative embodiment of the present invention, a personal area network (PAN) and/or wireless local area network (WLAN) may be formed by a plurality of wireless communication access devices such as, for example, mobile multimedia handsets, personal digital assistants (PDAs), and personal computers. Other elements of such a network may, for example, include computer peripherals such as digital scanners, digital cameras, printers, headphones, and pointing devices, that may be located within the immediate proximity of a person. A PAN and/or WLAN may be an ad-hoc network of such communication devices. In a representative embodiment of the present invention, access devices within the PAN and/or WLAN may communicate with any of the other access devices within the PAN and/or WLAN and also with other access devices that are located in other networks accessible via the PAN and/or WLAN, including networks accessible via a broadband access provider such as, for example, the BAP 106. The personal area networks/wireless local area networks may include data networks such as, for example, Institute of Electrical and Electronics Engineer (IEEE) 802.15.3a compliant ultrawideband wireless networks. Such personal area networks may operate in unlicensed radio frequency spectrum such as, for example, the 2.4 and 5 gigahertz regions. Details of one example of a personal area network are provided in the document "Bluetooth Core Specification V1.2", Nov. 5, 2003, from Bluetooth SIG, Inc., the complete subject matter of which is hereby incorporated herein by reference, in its entirety. For example, in a Bluetooth wireless PAN, a first Bluetooth-enabled wireless access device may communicate with a second Bluetooth-enabled wireless access device within the PAN.

Additionally, either of the first and second Bluetooth-enabled wireless access devices may communicate with the Internet, a wireless local area network or another LAN or WAN via the Bluetooth wireless PAN.

In a representative embodiment of the present invention, a gateway may be adapted to provide seamless and transparent communication among a plurality of access devices and a plurality of networks. The functionality of the gateway may be divided, for example, into application content functionality, and configuration and management functionality. The application content functionality may, for example, deal with the types of applications that may be supported by the gateway as well as the various types of data that may be received, processed and/or transmitted by the gateway. In this regard, application content functionality may also include the manner in which other devices and/or systems may utilize data from the gateway.

The content and application services supported by an embodiment of the present invention may be of significant importance, because all information coming into and leaving the home from either the WAN side (i.e., the broadband connection side), or from the PAN/WLAN side (i.e., the access device side) converges at the gateway. The PAN/WLAN side may comprise a Bluetooth/IEEE 802.15.3a, a wireless LAN (802.11a/b/g), and/or a cellular network, for example. Notwithstanding, the gateway may be adapted to convert wirelessly received GSM-formatted information into, for example, Internet protocol (IP)-formatted information and in reverse, may convert IP-formatted information into wireless GSM-formatted information suitable for over-the-air transmission. In a representative embodiment of the present invention, the gateway may comprise suitable circuitry, logic and/or code that may be adapted to receive and process MPEG related data, which may be suitable for display on a screen. The gateway in an embodiment of the present invention functions as a focal point where data converges from a plurality of wired and wireless services. Although, in a particular embodiment of the present invention the gateway may do very little in terms of actual content aggregation, there is virtual aggregation of data. The converged data may be integrated and or otherwise utilized to offer unique opportunities for launching various content and application services from a single strategic location. Since the gateway in an embodiment of the present invention is the focal point where data converges, one or more protocol stacks may be employed for launching the various content and application services.

The gateway in a representative embodiment of the present invention may be adapted to route calls based on established rules that may be programmed into the gateway. For example, the gateway may be governed by a rule which states that local calls are to be routed to an incumbent local exchange carrier (iLEC), while long distance calls are to be handled by Long Distance Carrier Company. Accordingly, when a call originates at the gateway and it is determined that the call is a local call, the gateway may be adapted to route the call to the iLEC. However, if the gateway determines that the call is a long distance call, then the gateway may be adapted to route the call to Long Distance Carrier Company.

A representative embodiment of the present invention is an effort to solve the cost and signal propagation or penetration problems in homes and small businesses by utilizing a wireless broadband access gateway that is installed inside the homes, offices, and small businesses. A wireless broadband access gateway in accordance with the present invention may be adapted to utilize unlicensed spectrum such as, for example, at 2.4 or 5.8 GHz, and may generally function as a gateway and/or bridge. In other representative embodiments of the present invention, the broadband access gateway may actually function more like a bridge rather than an actual gateway. The backbone links utilized by such a gateway may leverage existing broadband infrastructure that is commonly found in many homes and businesses today. Because a consumer is already paying for the use of the broadband infrastructure in their home or office, leveraging the use of the existing broadband infrastructure for the backbone link results in minimal or no additional communication costs. The broadband backbone infrastructure may be, for example, a cable or DSL infrastructure.

In a representative embodiment of the present invention, the wireless interface function provided by the wireless broadband access gateway located within a home, for example, may be utilized to route a great deal of traffic to a wired network such as a broadband network or a wireless network such as a GSM or CDMA network via a broadband connection. In other words, the wireless broadband access gateway infrastructure provided within a home provides a scalable network infrastructure that rides on an existing access infrastructure already supplied by a broadband service provider to a home, office or business. Additionally, the scalable infrastructure provided by the wireless broadband access gateway also solves problems associated with signal penetration and propagation, thereby providing improved quality of service (QoS). From a market perspective, a wireless service provider may now have access to the necessary infrastructure to provide improved wireless services to users within a home or office. Accordingly, in order to rapidly increase their growth, wireless service providers may now target that portion of the in-home landline or plain old telephone system (POTS) business, which have traditionally been handled by incumbent local exchange carriers (ILECs) or other LECs.

The unlicensed mobile access gateway described above may possess a significant amount of processing power. Numerous basic and enhanced communication services may be enabled or provided by a wireless broadband access gateway in accordance with a representative embodiment of the present invention. Access devices such as, for example, a mobile multimedia handset that embodies a high functionality combination of a cellphone, personal digital assistant, still and/or video camera, and audio player, for example, may utilize these basic and enhanced communication services enabled by the new wave of digital technologies. Representative embodiments of the present invention provide the range of support needed for their use by the everyday consumer.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A system comprising:
   a gateway configured to communicate with one or more access devices;
   a modem operable to selectively communicate multimedia information between the gateway and a broadband network; and
   a wireless interface in data communication with the gateway to selectively communicate multimedia information and information about multimedia information available at the one or more access devices to be shared with others of the one or more access devices with the gateway and the one or more access devices, the wireless interface operable in conjunction with the gateway to hand off communication with an access device from the wireless interface to a wireless wide area network.

2. The system of claim 1 wherein the wireless interface is further operable in conjunction with the gateway to communicate network availability data to the access device, the network availability data providing an indication to the network access device of availability of the wireless wide area network.

3. The system of claim 1 wherein the wireless interface is further operable in conjunction with the gateway to communicate handoff data to the access device to provide to a user of the access device an indication of handoff of communication between the wireless wide area network and the wireless interface.

4. The system of claim 3 wherein the wireless interface is further operable to provide the handoff data comprising data to cause the access device to display a visual indication of the handoff of communication between the wireless wide area network and the wireless interface.

5. The system of claim 3 wherein the wireless interface is further operable to provide the handoff data comprising data to cause the access device to play an audible indication of the handoff of communication between the wireless wide area network and the wireless interface.

6. The system of claim 1 wherein the multimedia information comprises one or more of streaming video, broadcast video, digitized audio, digitized video data and digitized still images.

7. The system of claim 1 wherein the wireless interface comprises a radio circuit operable according to one or more of Bluetooth, IEEE 802.11 or IEEE 802.15 standards.

8. A method comprising:
at an access device, communicating information about multimedia content available at the access device to a wireless interface, the communicated information usable to access the multimedia content by other access devices in communication with the wireless interface;
at the access device, communicating multimedia data with a wireless wide area network;
at the access device, determining to hand off communication of the multimedia data from the wireless wide area network to the wireless interface; and
in response to a handoff indication, terminating communication with the wireless wide area network and commencing communication of multimedia data with the wireless interface.

9. The method of claim 8 further comprising:
receiving from the wireless wide area network an indication to hand off the communication of the multimedia data.

10. The method of claim 8 further comprising:
receiving from a gateway associated with and in data communication with the wireless interface an indication to hand off the communication of the multimedia data.

11. The method of claim 8 further comprising:
receiving from the wireless interface a notification that handoff of the communication of the multimedia data is possible; and
providing to a user of the access device a handoff indication.

12. The method of claim 11 wherein providing the handoff indication comprises providing an indication that handoff is possible.

13. The method of claim 11 wherein providing the handoff indication comprises providing an indication that handoff has occurred.

14. A method comprising:
at a gateway, establishing data communication with a wireless interface and a broadband network;
at the gateway, collecting from one or more access devices in radio communication with the wireless interface information about multimedia content available at the one or more access devices and that may be utilized to locate and access the multimedia content stored on the access devices;
at the gateway, selectively communicating multimedia information content among the broadband network, the wireless interface and the one or more access devices in radio communication with the wireless interface;
at the gateway, communicating handoff information among the broadband network, the wireless interface and an access device, the handoff information controlling handoff of multimedia communication between the access device and one of the wireless interface and a wireless wide area network.

15. The method of claim 14 further comprising:
at the gateway, authenticating the access device; and
providing to the access device access to multimedia services offered by the gateway.

16. The method of claim 14 further comprising:
registering at the gateway the access device and at least a portion of data content of the access device; and
making available to other access devices data content of the access device through the gateway.

17. The method of claim 14 further comprising:
at the gateway, de-registering the access device when the access device is no longer serviced by the gateway; and
releasing the data content of the access device.

18. The method of claim 14 further comprising:
at the gateway, adjusting data handling according to whether the access device is in data communication with the wireless wide area network or the wireless interface.

19. The method of claim 18 wherein adjusting data handing comprises, at the gateway, using a lower data compression rate to provide data to the access device when the access device is in data communication with the wireless wide area network and using a higher data compression rate to provide data to the access device when the access device is in data communication with the wireless interface.

20. The method of claim 18 wherein adjusting data handing comprises, at the gateway, automatically converting data format to a format suitable for display on the access device.

* * * * *